May 28, 1963

M. JEAN ET AL 3,091,593

METHOD FOR PRODUCING MIXTURES OF HYDROGEN
AND CARBON MONOXIDE

Filed Jan. 19, 1960

3,091,593
METHOD FOR PRODUCING MIXTURES OF
HYDROGEN AND CARBON MONOXIDE
Marcel Jean, Paris, and Jacques Lelong, Mont-Saint-
Aignan, France, assignors to Societe Chimique de la
Grande Paroisse, Azote et Produits Chimiques
Filed Jan. 19, 1960, Ser. No. 3,308
Claims priority, application France Jan. 29, 1959
8 Claims. (Cl. 252—373)

Our invention has for its object a method for producing mixtures of hydrogen and carbon monoxide through oxidation of gasiform hydrocarbons by an oxidizing gas, either oxygen or steam. According to said method, the gases, when converted, are set in contacting relationship with an aqueous washing liquid adapted to absorb the carbon dioxide formed and the solution obtained is returned into contact with a fraction of the gases to be sent into the oxidizing reaction, which gases absorb its carbon dioxide. We obtain thus a shifting of the chemical equilibrium which furthers the increase of the contents of carbon monoxide of the gasiform mixture, since the carbon dioxide leads to the transformation defined by the balanced reaction:

$$CO_2 + H_2 \rightleftharpoons CO + H_2O$$

We obtain thus, after treatment, a mixture containing simultaneously $CO_2$, $CO$, $H_2$ and $H_2O$, together with small amounts of hydrocarbons such as methane corresponding to another balanced reaction expressed by the equation:

$$CH_4 + 2H_2O \rightleftharpoons CO_2 + 4H_2$$

The oxidation of the hydrocarbons may assume the nature, either of a catalytic reforming in the presence of steam under endothermic conditions, or of an exothermic cracking, whether catalytic or otherwise.

The liquid absorbing the carbon dioxide acts through a mere physical dissolution such as a washing with water, or else, through a chemical combination such as a washing by means of an alkaline solution containing potassium, sodium or ammonium carbonate, tripotassium phosphate or an ethanolamine, under a pressure equal to or higher than the pressure of the converted gasiform mixture.

The liquid thus laden with carbon dioxide is then set wholly or partly in contact with at least one of the gasiform streams, either the hydrocarbons or the oxidizing gas, which are to take part in the oxidation reaction generating the final gas, under conditions of temperature and pressure such that the amount of carbon dioxide which is to take part in the transformation may be evolved from the absorbing liquid which is thus at least partly regenerated.

In the case of a reforming treatment, the aqueous solution of carbon dioxide is preferably set in contact with at least a fraction of the gasiform hydrocarbons to be oxidized and it is previously heated to a temperature such that, during its contact with the hydrocarbons, a fraction of its water may be carried along in the form of steam with the latter, together with the carbon dioxide. The heat required may be obtained for instance through an exchange of heat with the converted gases obtained through the reforming. The hot solution is set in contact with the hydrocarbons to be converted, generally through a counter-current flow inside a scrubber, which leads then to a double result. The gas to be reformed is laden both with carbon dioxide and with steam, as required for the two simultaneous reactions which may be diagrammatically illustrated in the case of methane by the two following equations:

$$CH_4 + H_2O \rightleftharpoons CO + 3H_2$$
$$CH_4 + CO_2 \rightleftharpoons 2CO + 2H_2$$

The adjustment of the preheating of the carbonate-containing solution to be directed towards the scrubber allows controlling the proportions of steam and carbon dioxide taking part in the transformation and, consequently, the proportions of carbon monoxide and hydrogen in the converted gas. Furthermore, the hot solution of carbonate is both regenerated and cooled through its contact with the hydrocarbons to be converted, so that it may be reused directly for the removal of the carbon dioxide out of the formed gases.

It is known, on the other hand, that the gas to be transformed and containing carbon dioxide should not be set in contact with the reforming catalyst at a temperature lower than a predetermined threshold, so as to cut out any formation of carbon black. Various methods may be used with a view to preventing such a formation of carbon black, but our improved method allows reaching said result in a very simple manner, while leading to the obtention of a converted gas having high contents of carbon monoxide.

According to our invention, we introduce the fraction of gases laden with carbon dioxide into a point of the oxidizing area where the reaction conditions are such that no carbon black can possibly form.

According to a first modified embodiment of our invention, the gasiform hydrocarbons to be transformed are subdivided into two fractions: a first fraction is subjected to a first reforming in the presence of steam and the aqueous solution of carbon dioxide is set in contact with the second fraction of the hydrocarbons, after which said second fraction laden with carbon dioxide is admixed with the hot converted gases obtained through the reforming of the first fraction and a further reforming is proceeded with. The second hydrocarbon fraction reacts then in the presence of the carbon dioxide introduced with it and there is obtained at the end of the reaction an equilibrium in the gasiform output between the carbon monoxide and the hydrogen, which equilibrium has been shifted in the desired direction as a consequence of the introduction of carbon dioxide.

We may also introduce carbon dioxide only after a first reforming in the presence of steam, with a view to providing for a post-combustion of the gas thus reformed, said post-combustion being produced by means of a gas containing free oxygen, whether air or pure oxygen. The carbon dioxide is recycled, in this case, through contact of the aqueous solution of carbon dioxide with the oxygen-containing gas or with a further fraction of hydrocarbons fed directly into the post-combustion stage.

When the mixture of carbon monoxide and hydrogen is prepared through an exothermic cracking, the improvements described precedingly remain applicable in principle. However, it is possible to resort to various further improvements.

Firstly, the washing solution laden with carbon dioxide is set preferably in contact solely with the oxygen-containing gas. This prevents the hydrocarbons to be converted from being left in the presence of carbon dioxide before they are raised to a temperature higher than the threshold of formation of carbon black.

Furthermore, if the oxidizing gas is constituted by pure oxygen, it is possible to produce its compression, if desired, after loading it with carbon dioxide, which latter increases the safety of the compression operation.

Lastly, if the absorption of carbon dioxide in the transformed gases is performed under a pressure higher than that at which the gasiform or vaporized hydrocarbons to be transformed are available, we may, according to a further feature of our invention, provide for a partial expansion of the washing liquid and the gases released by the latter are admixed with the hydrocarbons to be oxidized, while the remaining liquid is set in contact with the gas containing free oxygen which is to serve for the oxidation of the hydrocarbons. During the partial expansion of the liquid, the major part of the volatile gases (hydrogen, carbon monoxide and the like) dissolved in the liquid is released, together with a small fraction of the carbon dioxide. The released gases are then recycled into the hydrocarbons to be treated, while the washing liquid freed of its sparingly soluble volatile gases, but containing still a large amount of carbon dioxide, is sent, if required after preheating, into contact with the oxidizing gas (air or oxygen). Thus, the oxidizing gas is loaded only with a negligible fraction of hydrogen or carbon monoxide additional to the carbon dioxide, which cuts out any risk of formation of dangerous inflammable mixtures. On the other hand, only a small amount of carbon dioxide is admixed with the hydrocarbons, which cooperates in cutting out the possible formation of carbon black, as already mentioned hereinabove.

We will now describe our invention with further detail, reference being made to the accompanying drawings illustrating plants for oxidizing hydrocarbons and recyling the carbon dioxide formed in accordance with our improved method. In said drawings.

Figure 1:
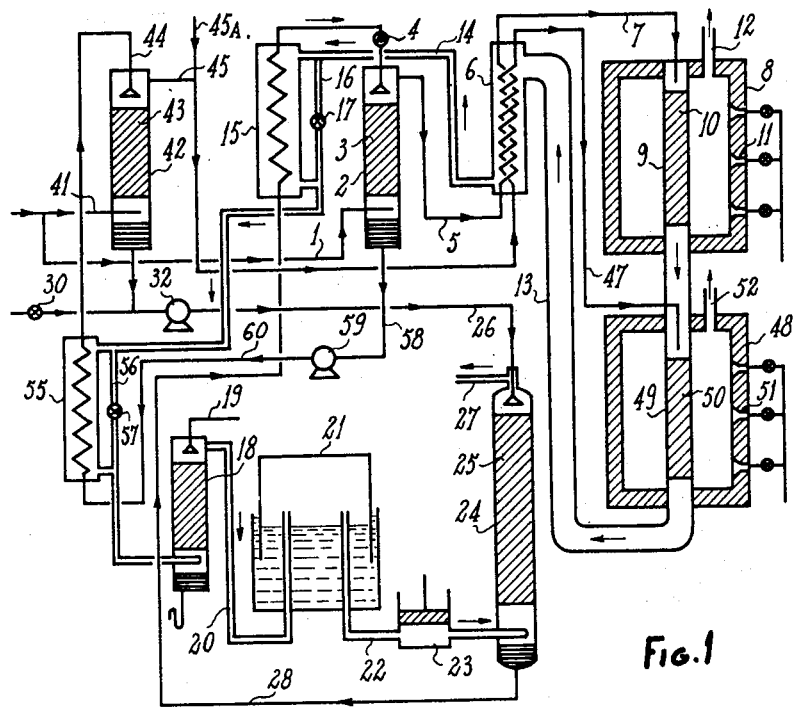
FIGURE 1 illustrates a plant for the reforming of hydrocarbons in two successive stages, according to which a first fraction of the hydrocarbons, laden with carbon dioxide, is mixed with the hot gases obtained through a first reforming and is then sent with the latter to a final reforming stage.

*Example 1.*—By way of an example, which is not to be construed in a limiting sense, of the application of our invention to the treatment of hydrocarbons, we will now describe, with reference to FIGURE 1, a plant for the treatment of 1,030 cub. m. per hour of natural gas through reforming in the presence of steam, with a view to obtaining about 4,000 cub. m. per hour of a mixture $(CO+2.08\ H_2)$ suitable for the synthesis of methanol.

The natural gas admitted under a pressure of about 1.8 absolute atmosphere is subdivided into two fractions, of which one is fed by the pipe 1 into the tower 2 and is washed in counter-current relationship by a hot solution of bicarbonate fed through the pipe 28 into the heat exchanger 15 which is heated by the cracked gases fed through the pipe 14. Said heat exchanger 15 may be provided with a by-pass constituted by the pipe 16 controlled by the cock 17. The gasiform mixture, when it has passed through the tower 2 inside which it has been laden with a large amount of $CO_2$ produced by the dissociation of the bicarbonate solution, is preheated in a corresponding circuit inside the heat exchanger 6 into which it enters through the pipe 5 and out of which it is fed through the pipe 47 into the second element 48 of a catalytic reforming furnace 8—48, which second element is fed with the very hot gasiform mixture which has already been subjected to a first catalytic reforming in the tubes 9 of the first element 8 of the reforming furnace.

The second fraction of the hydrocarbon gas to be transformed is directed by the pipe 41 into the tower 42 packed with contact packing 43 and inside which the gas is washed in counter-current relationship by a solution of partly regenerated potassium carbonate passing out of the tower 2, as provided by the pump 59 sucking said solution through the pipe 58 into the pipe 60 and thence through the heat exchanger 55 into the tower 42 through the pipe 44. When it has been fed with an addition of steam entering through the pipe 45A, the gas thus laden with steam is heated, simultaneously with the first fraction, in the above-mentioned heat exchanger 6 and enters the pipe 7 leading it into the tubes 9 of the first element 8 of the catalytic reforming furnace.

The solution of potassium bicarbonate, the contents of $CO_2$ of which have decreased in the tower 2, is thus reheated in the heat exchanger 55 by external heat such as that of the stream of converted gases. The amount of heat applied being adjusted through operation of the cocks 17 and 57, it abandons its heat in the tower 42, while moistening the second fraction of gases entering the plant at 41, as mentioned hereinabove. The solution of potassium carbonate abandons simultaneously the dissociatable $CO_2$ still contained in it, after which the solution passing out of the tower 42 which is cooled and released of its carbon dioxide, may be returned through the pump 32 and the pipe 26 into the tower 24 in which the compressed cracked gas fed through the system 18—23, is released of its carbon dioxide.

Said technique allows introducing into the hydrocarbon fraction treated in the tower 42 and then in the pipe 9 of the furnace element 8, only a small fraction of the carbon dioxide which is the less readily dissociated, fraction carried by the potassium bicarbonate formed in the tower 24, while ensuring simultaneously the introduction of a large proportion of steam. On the other hand, this modus operandi introduces the major fraction of $CO_2$ which is that which is the more readily dissociated and an adjustable proportion of steam into the fraction of hydrocarbons treated first in the tower 2 and then in the pipes 49 of the furnace section 48. It is a well-known fact that it is of advantage to maintain low contents of $CO_2$ and a large proportion of steam in the gas entering the pipes 9, since this cuts out any formation of carbon black in the first layers of the catalyst 10 in the furnace section 8, i.e. in the area where the gasiform mixture has not yet reached the temperature of gasification of the carbon black through steam.

It is possible, in fact, to observe in such areas transformations such as:

$$CO_2+CH_4 \rightarrow 2C+2H_2O$$

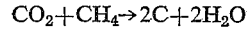

which generates carbon black, whereas the introduction of a mixture of methane and carbon dioxide into the very hot gasiform stream which has already been transformed in the pipes 9, produces only in the pipes 49 of the second section 48, which are above 600–650° C., reactions such as:

$$CH_4+CO_2 \rightarrow 2CO+2H_2$$

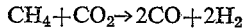

which leads to increasing the contents of CO in the gas finally obtained, without any risk of formation of carbon black.

Figure 2:
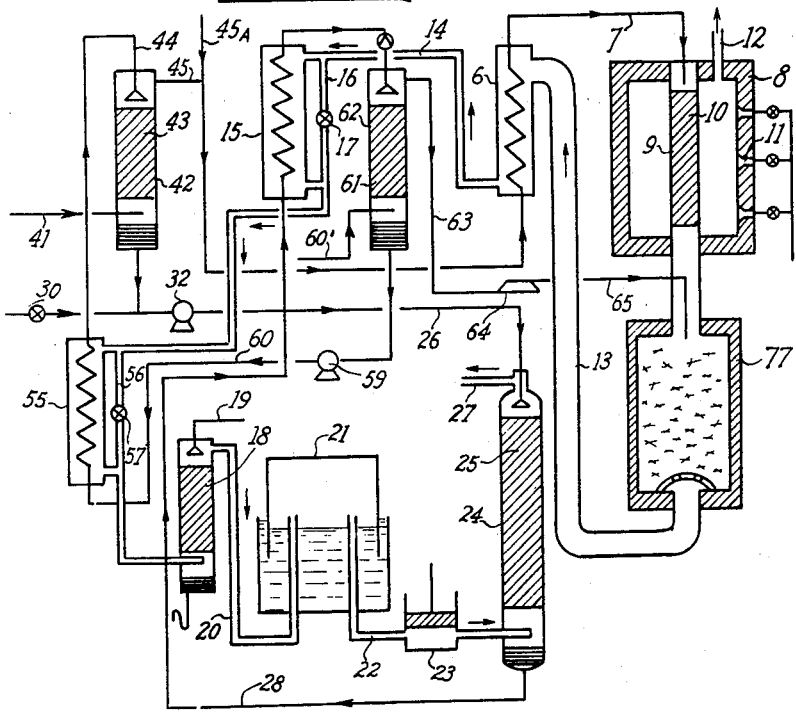
FIGURE 2 illustrates a reforming plant for the reforming of hydrocarbons and their post-combustion, wherein the carbon dioxide is recycled into the oxygen fed into the post-combustion furnace.

*Example 2.*—Turning now to FIGURE 2 illustrating a modification of the reforming circuit, the second reforming is replaced by a post-combustion step and the carbon dioxide absorbed by the washing solution is admixed with the oxygen sent into the post-combustion stage.

The washing solution laden with carbon dioxide in the washing tower 24 is heated in the heat exchanger 15 and is sent into the washing tower 61 containing a packing 62 and inside which a stream of oxygen enters, through the pipe 60', in counter-current relationship with the washing solution. The oxygen is thus laden with carbon dioxide and enters, through the pipe 63, the blowing means 64 and the pipe 65, the input of the post-combustion furnace 77 which is filled with a catalyst for the oxidation of the hydrocarbons and wherein the oxygen laden with carbon dioxide is mixed with gases at a temperature of 680–690° C. containing still 5 to 6% of methane fed by the pipes 9 of the reforming furnace 8.

The washing solution which is released of the major fraction of its carbon dioxide is delivered by the pump 59 into the heat exchanger 55 and thence through the pipe 44 into the upper end of the washing tower 42, where it is cooled by the incoming stream of natural gas fed by the pipe 41 and flowing in counter-current relationship with reference to said washing solution; the natural gas is thus heated and loaded with steam. After incorporation of an additional amount of steam through the pipe 45A, the gas is sent through the pipe 7 and the heat exchanger 6 into the input of the pipe 9 of the catalytic reforming furnace 8.

At the output of the post-combustion furnace 77, the converted gases which contain only about 0.3% of methane are cooled in succession, as in the case of FIGURE 1, in the heat exchangers 6, 15 and 55 and then washed by a solution of bicarbonate in the washing tower 24 and sent into the utilisation apparatus through the pipe 27.

Figure 3:
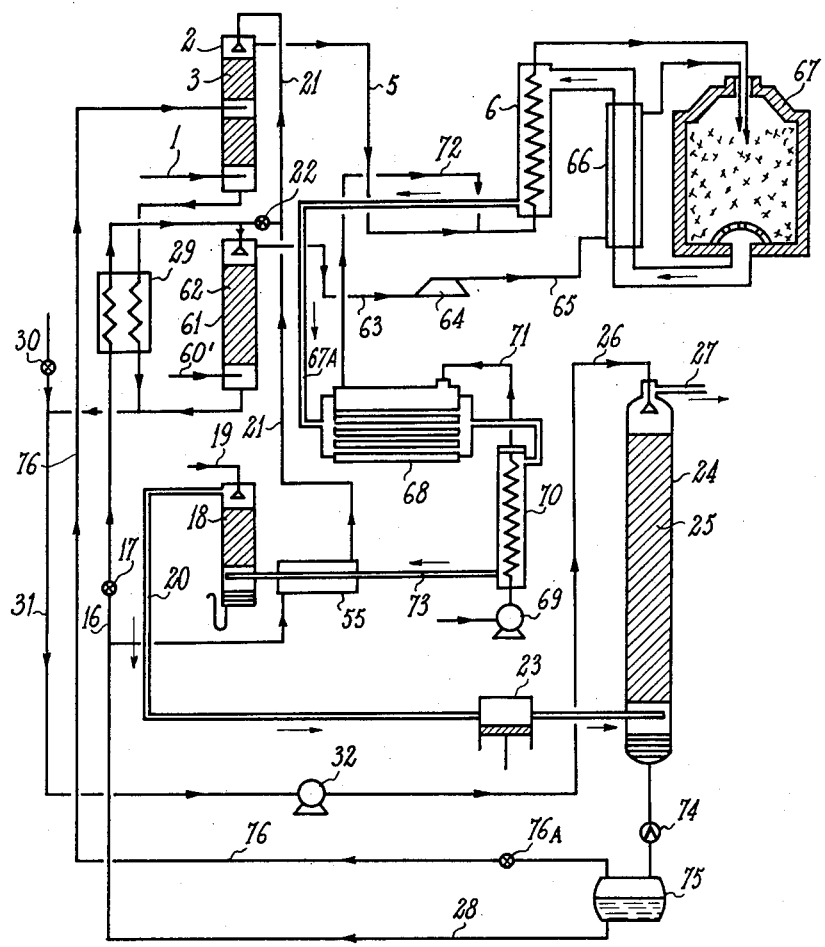
FIGURE 3 illustrates a plant for the exothermic cracking of hydrocarbons, wherein the washing liquid laden with carbon dioxide expands, while the gases evolved thereby are introduced into the hydrocarbons to be treated and the carbon dioxide still dissolved into the oxygen sent to the cracking furnace.

*Example 3.*—FIGURE 3 illustrates diagrammatically a further plant according to our invention, said plant being intended for the preparation of 4,800 cub. m. per hour of a compressed mixture of $CO+2H_2$, as obtained through the gradual catalytic combustion of hydrocarbons (say 1,840 cub. m. per hour of methane), by means of a limited amount of oxygen (about 1,050 cub. m. per hour). The introduction of $CO_2$ through recycling into the reacting mixture allows modifying the equilibrium and obtaining richer gasiform mixtures including adjustable contents of CO.

According to our invention, the methane entering the plant through the pipe 1 under a pressure of about 10 atmospheres is fed into the tower 2 provided with a packing of contact elements 3 and wherein the methane is washed in counter-current relationship by a throughput of 15 cub. m. per hour of an aqueous solution of potassium carbonate laden with $CO_2$ and which has been heated in the heat exchanger 55 up to about 180° C., said solution being fed by said heat exchanger into the tower 2 through the pipe 21. As a consequence of its contact with the gas, the solution obtained at the lower end of the tower 2 is cooled down to about 98° C., while the methane is loaded with 320 cub. m. per hour of $CO_2$ and with 1,500 kg. per hour of steam and is heated up to 150° C. The tower 2 is fed furthermore through the channel 76 with the gasiform fraction produced by the expansion down to 10 atmospheres inside the vat 75 of the purifying solution which has removed in the tower 24 the $CO_2$ out of the final gas obtained under a pressure of 30 atmospheres. The channel 72 incorporates into the methane about 400 kg. per hour of live steam at a point beyond the tower 2.

The oxygen is brought in at substantially atmospheric pressure by the pipe 60' opening into the tower 61 packed with contact elements 62. It is washed in said tower by a throughput of 35 cub. m. per hour of the aqueous solution of potassium carbonate loaded with $CO_2$ at 24 through the pipes 28 and 16, the latter of which forms a by-pass controlled by the cock 17; said solution is heated, prior to its admission into the tower 61, in the heat exchanger 29. We may provide a possible incorporation therewith of a hotter solution out of the heat exchanger 55 under control of the cock 22 adjusting the passage of a fraction of the solution out of the heat exchanger 55. The $CO_2$ is released by the solution in contact with the oxygen and the mixture formed by 1,050 cub. m. per hour of oxygen and 760 cub. m. per hour of $CO_2$ is delivered under 10 atmospheres by the blowing means 64 into the pipe 65, so as to enter, through the heat exchanger 66, the catalytic cracking furnace 67 containing a catalyst in contact with which are performed, under a pressure of 10 atmospheres, reactions such as:

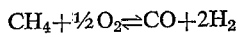

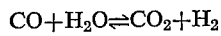

which leads to the obtention of a gasiform mixture passing out of the furnace at a temperature of about 850° C. and which is constituted approximately in volumes per hour by: $CO_2=1,290$ cub. m. $CO=1,640$ cub. m. $H_2=3,380$ cub. m. $CH_2=120$ cub. m. $H_2O$ vapor= 2,600 cub. m.

After having abandoned a fraction of its sensible heat to the heat exchangers 66 and 6, the mixture passes through the pipe 67A, the boiler 68, the economizer 70 and it is fed through the pipe 73 into the heat exchanger 55 heating the solution of bicarbonate and in contact with which a large fraction of the steam still contained in the cracked gas is condensed, which leads to a substantial production of heat and furthers the dissociation of the potassium bicarbonate contained in the solution which is to feed the towers 2 and 61.

The solutions passing out of the bottom of said towers 2 and 61 may be, if desired, subjected to a complementary regeneration by means which are not illustrated and they are then sucked in by the pump 32 which delivers them into the upper end of the washing tower 24. The latter is fed at its lower end with the cracked gases fed into it through the pipe 20 and which have been previously cooled inside the condenser 18, so as to be compressed by the compressor 23, which raises them to a pressure of about 30 atmospheres.

Thus, it is possible to recover and to recycle almost the totality of the $CO_2$ contained in the cracked gases, in a manner such that the stream of oxygen may be practically devoid of the combustible gases $H_2O+CO$ dissolved in the purifying solution, which gases are evolved during the partial expansion through the pressure-reducing valve 74 and which separate in the vat 75, while the same stream of oxygen absorbs, through counter-current contacting relationship at 61 with the solution, the major fraction of the $CO_2$ to be recycled, the presence of said inert diluting gas improving the safety of compression by the blowing means 64. Through this arrangement also, the condensation heat of the steam contained in the cracked gas serves both for dissociating the bicarbonate of potassium and for moistening the gasiform fluids which are to react with one another, as required for preventing the formation of carbon black, the dissociated solution of bicarbonate being thus reactivated, so as to serve for a further absorption of carbon dioxide, in accordance with the cyclic procedure described.

Instead of using for the removal of the carbon dioxide a chemical absorption through an alkaline reagent, we resort to the mere physical dissolution of $CO_2$ in water; the input of water to be introduced into the washing tower 24 is of the order of 250 to 400 cub. m. per hour according to the temperature of the water. The gasiform mixture released at 75 and fed through the pipe 76 is of the magnitude of 180 cub. m. per hour, of which 140 cub. m. consist of a gasiform mixture $CO_2+H_2$ and are directed towards the hydrocarbon fraction, but not towards the oxygen circuit, while the input of water is maintained at a magnitude of 15 cub. m. per hour into the tower 2 and the remainder is directed into the tower 61 or into auxiliary gas-releasing means.

What we claim is:
1. A method for converting gaseous hydrocarbons into a mixture of hydrogen and carbon monoxide, comprising the steps of: washing a stream of a gas containing free oxygen with an aqueous washing liquid adapted to evolve carbon dioxide, thereby mixing said gas containing free oxygen with the carbon dioxide evolved from said aqueous washing liquid and yielding an aqueous washing liquid depleted of carbon dioxide, compressing the mixture of free oxygen containing gas and evolved carbon dioxide, mixing the gaseous hydrocarbons to be converted with said compressed gas mixture containing free oxygen and carbon dioxide, thereby obtaining mixed gases; submitting said mixed gases to a cracking operation, thereby obtaining converted gases; washing said converted gases with said aqueous washing liquid depleted of carbon dioxide, thereby absorbing carbon dioxide into said aqueous washing liquid; and recycling at least part of said aqueous washing liquid laden with carbon dioxide to said first mentioned washing step.

2. A method for converting gaseous hydrocarbons into a mixture of hydrogen and carbon monoxide, comprising the steps of: washing a stream of a gas containing free oxygen with an aqueous washing solution adapted to evolve carbon dioxide, thereby mixing said gas containing free oxygen with the carbon dioxide evolved from said aqueous washing liquid and yielding an aqueous washing liquid depleted of carbon dioxide, mixing the gaseous hydrocarbons to be converted with said gas containing free oxygen and carbon dioxide, thereby obtaining mixed gases, submitting said mixed gases to a cracking operation, thereby obtaining converted gases; washing said converted gases under pressure with said aqueous washing liquid depleted of carbon dioxide, thereby absorbing carbon dioxide into said aqueous washing solution, expanding said aqueous washing solution laden with carbon dioxide; mixing the gases released by such expansion with the gaseous hydrocarbons to be converted; and recycling said aqueous washing solution laden with carbon dioxide to said first mentioned washing step.

3. A method according to claim 2, wherein the gas containing free oxygen is initially under a lower pressure than the hydrocarbon gases, and is compressed to the pressure of the cracking operation only after being mixed with carbon dioxide.

4. A method for converting gaseous hydrocarbons into a mixture of hydrogen and carbon monoxide, comprising the steps of: washing a stream of a gas containing free oxygen with an aqueous washing liquid adapted to evolve carbon dioxide, thereby obtaining a gas containing free oxygen and carbon dioxide and an aqueous washing liquid depleted of carbon dioxide; mixing the gaseous hydrocarbons to be converted with said gas containing free oxygen and carbon dioxide, thereby obtaining mixed gases; submitting said mixed gases to a cracking operation, thereby obtaining converted gases; compressing said converted gases; compressing said aqueous washing liquid depleted of carbon dioxide; washing under pressure said converted gases with said aqueous washing liquid depleted of carbon dioxide, thereby absorbing carbon dioxide into said aqueous washing liquid; expanding said aqueous washing liquid laden with carbon dioxide; mixing the gases released by said expansion with the gaseous hydrocarbons to be converted; and recycling the expanded aqueous washing liquid still laden with carbon dioxide to said first-mentioned washing step.

5. A method for converting gaseous hydrocarbons into a mixture of hydrogen and carbon monoxide, comprising the steps of: washing a stream of a gas containing free oxygen with an aqueous washing liquid adapted to evolve carbon dioxide; thereby obtaining a gas containing free oxygen and carbon dioxide and an aqueous washing liquid depleted of carbon dioxide, mixing the gaseous hydrocarbons to be converted with said gas containing free oxygen and carbon dioxide, thereby obtaining mixed gases; submitting said mixed gases to a cracking operation, thereby obtaining converted gases; compressing said converted gases; compressing said aqueous washing liquid depleted of carbon dioxide; washing under pressure said converted gases with said aqueous washing liquid depleted of carbon dioxide, thereby absorbing carbon dioxide into said aqueous washing liquid; expanding said aqueous washing liquid laden with carbon dioxide; mixing the gases released by said expansion with the gaseous hydrocarbon to be converted; and recycling at least part of the expanded aqueous washing liquid still laden with carbon dioxide to the first mentioned washing step.

6. A method according to claim 5, wherein the gaseous hydrocarbons also are submitted to a washing with part of the expanded washing liquid still laden with carbon dioxide, and thereby mixed with evolved carbon dioxide, and the resulting aqueous washing liquid depleted of carbon dioxide is also compressed and fed to the washing step of the converted gases.

7. A method for converting gaseous hydrocarbons into a mixture of hydrogen and carbon monoxide, comprising the steps of: dividing a stream of gaseous hydrocarbons into two fractions; washing the first fraction with an aqueous washing liquid partly depleted of carbon dioxide, thereby mixing said first fraction with a minor portion of evolved carbon dioxide; subjecting said first fraction laden with a minor portion of carbon dioxide to a first reforming with steam, thereby obtaining hot converted gases; washing the second fraction with an aqueous washing liquid adapted to evolve carbon dioxide, thereby mixing with said second fraction a major portion of the carbon dioxide of the aqueous washing liquid and obtaining a second fraction laden with carbon dioxide and an aqueous washing liquid partly depleted of carbon dioxide; feeding said aqueous washing liquid partly depleted of carbon dioxide to said first mentioned washing step; mixing said hot converted gases and said second fraction laden with carbon dioxide, in such relative amounts that no carbon black can form; subjecting the mixture thereby obtained to a second reforming; washing the hot converted gases resulting from said second reforming with the aqueous washing liquid depleted of carbon dioxide resulting from said first mentioned washing step, thereby absorbing carbon dioxide into the aqueous washing liquid; and recycling said aqueous washing liquid laden with carbon dioxide to said second mentioned washing step.

8. A method for converting gaseous hydrocarbons into a mixture of hydrogen and carbon monoxide, comprising the steps of: washing the gaseous hydrocarbons with an aqueous washing liquid partly depleted of carbon dioxide, thereby mixing said gaseous hydrocarbons with a minor portion of evolved carbon dioxide and yielding an aqueous washing liquid depleted of carbon dioxide; subjecting said gaseous hydrocarbons laden with a minor portion of carbon dioxide to a reforming with steam, thereby obtaining hot converted gases; washing a gas containing free oxygen with an aqueous washing liquid adapted to evolve carbon dioxide, thereby mixing said gas containing free oxygen with a major portion of the carbon dioxide absorbed in the aqueous washing liquid, and obtaining a gas containing free oxygen and carbon dioxide and an aqueous washing liquid partly depleted of carbon dioxide; feeding said aqueous washing liquid partly depleted of carbon dioxide to said first mentioned washing step; mixing said hot converted gases and said gas containing free oxygen and carbon dioxide, thereby obtaining mixed gases; subjecting said mixed gases to a combustion step, thereby obtaining combustion gases; washing said combustion gases with said aqueous washing liquid depleted of carbon dioxide resulting from said first mentioned washing step, thereby absorbing carbon dioxide into the aqueous washing liquid; and recycling said aqueous washing liquid laden with carbon dioxide to said second mentioned washing step.

References Cited in the file of this patent

UNITED STATES PATENTS

| | | |
|---|---|---|
| 2,185,989 | Roberts | Jan. 2, 1940 |
| 2,486,879 | Rees et al. | Nov. 1, 1949 |
| 2,683,121 | Vincent | July 6, 1954 |